Feb. 2, 1937. I. L. EASTMAN 2,069,434
SPEED COUPLER
Filed March 16, 1936
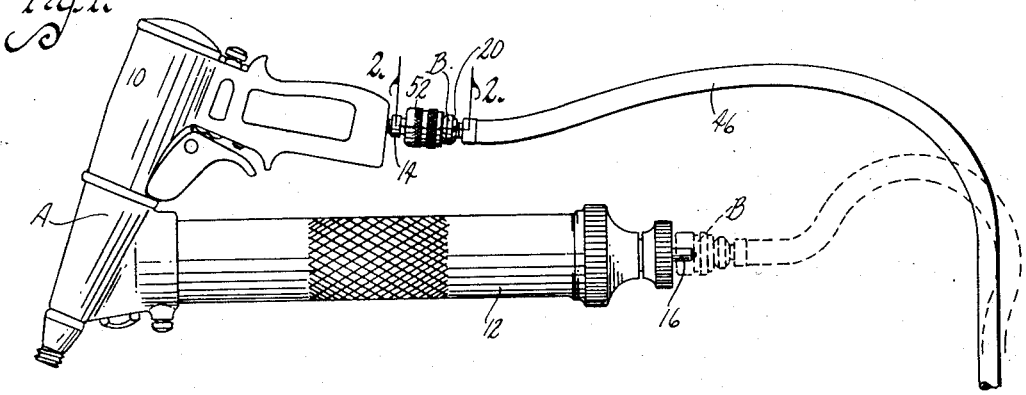
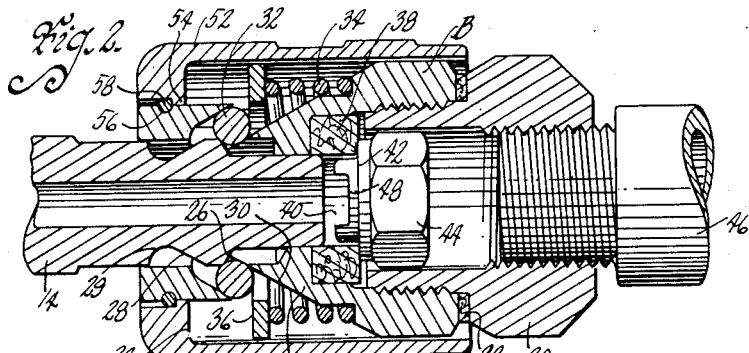
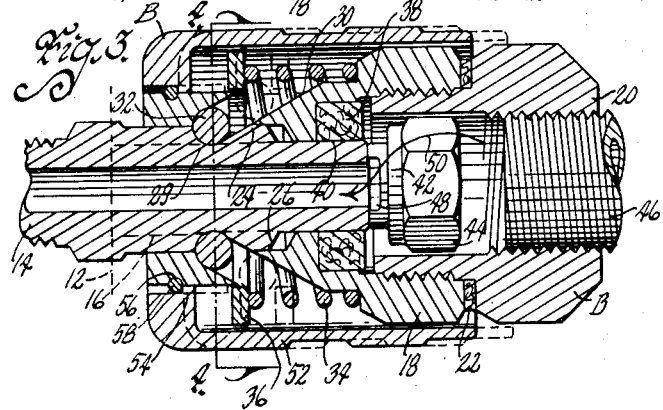
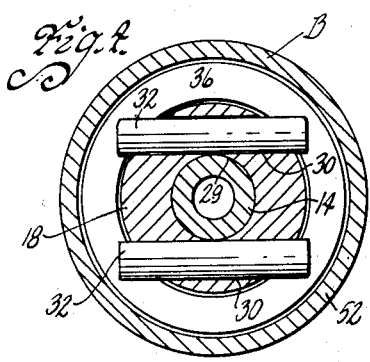
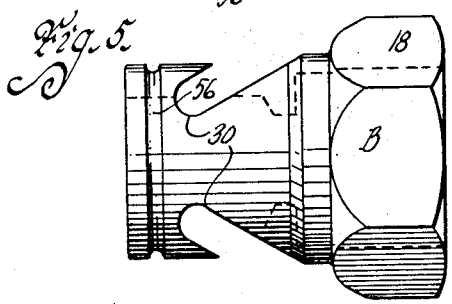
Inventor
Ivan L. Eastman
By Bair, Freeman & Sinclair
Attorneys
Witness
Edw. Seeley Patented Feb. 2, 1937

2,069,434

UNITED STATES PATENT OFFICE 2,069,434

SPEED COUPLER

Ivan L. Eastman, Bryan, Ohio, assignor to The Aro Equipment Corporation, Bryan, Ohio, a corporation of Ohio Application March 16, 1936, Serial No. 69,125

16 Claims. (Cl. 284—19)

An object of my invention is to provide a coupler which facilitates coupling and uncoupling a compressed air hose or the like relative to a device adapted to receive the compressed air, the parts of the coupler being comparatively simple and the coupling being inexpensive. The coupler is adaptable for coupling all types of fluid (either gas or liquid) lines and/or apparatus together with a fluid tight connection.

A further object is to provide a quick fluid line coupler comprising a nipple fitting and a sleeve fitting which are cooperable by merely pushing the sleeve fitting on the nipple fitting, and which include a cut-off arrangement automatically opened by the association of the sleeve fitting with the nipple fitting, whereupon air flows from one fitting to the other.

A further object is to provide a speed coupler which, when the parts are associated as described, will remain in association against any accidental disconnection, yet the two fittings may freely swivel, one relative to the other.

Still a further object is to provide a means operable at will for disconnecting one fitting relative to the other by a mere sliding of a portion of one of the fittings.

A further object is to provide within the fittings an effective means for sealing one fitting relative to the other when they are associated, yet which means is floatingly mounted and so arranged to coact with the parts that free swivel movement is had when the fittings are used for the transmission of fluid under pressure.

With these and other objects in view, my invention consists in the construction, arrangement and combination of the various parts of my speed coupler, whereby the objects contemplated are attained, as hereinafter more fully set forth, pointed out in my claims, and illustrated in the accompanying drawing, in which:

Figure 1 is a side elevation of a grease gun showing my speed or quick fluid line coupler being used in connection therewith.

Figure 2 is an enlarged sectional view on the line 2—2 of Figure 1, showing the fittings of the coupler being associated with each other.

Figure 3 is a similar view showing them fully associated.

Figure 4 is a detail sectional view on the line 4—4 of Figure 3; and

Figure 5 is a side elevation of a part of one of the fittings to show the construction thereof.

On the accompanying drawing I have used the reference character A to indicate generally a grease gun. The grease gun A has a power unit 10 and a reservoir 12. The power unit 10 is provided with a nipple fitting 14 and the reservoir 12 with another type of nipple fitting 16.

For coaction with the nipple fitting 14 I provide a sleeve fitting B comprising a pair of sleeves 18 and 20 connected as by threading and sealed relative to each other by a gasket 22, and parts 32, 36, 34, 38, 44, 52 and 58, as hereinafter described in detail.

The nipple fitting 14 is provided with an annular shoulder 24 having a front face 26 and a rear face 28. The sleeve 18 of the sleeve fitting B, as best shown in Figure 5, is provided with a pair of slots 30, which are inclined inwardly and toward the outer end of the sleeve 18, the outer end being the left end. The slots 30 are milled in from opposite sides of the sleeve and are adapted to slidably receive pins 32. The pins 32, as shown in Figure 4, extend beyond the outline of the sleeve 18.

The pins 32 are normally constrained toward the inner ends of the slots 30 (or toward the outer end of the sleeve 18) by a coil spring 34, a washer 36 being interposed between the spring and the pins.

Within the sleeve fitting B I provide a sealing washer 38 which is preferably floatingly mounted and formed of a suitable composition which is slightly resilient. This washer has a bore 40 adapted to snugly receive the external diameter of the inner end of the nipple fitting 14, and serves the double purpose of a sealing surface on the nipple fitting and a sealing surface for a sealing edge 42 of a slidably mounted cut-off plug 44.

The cut-off plug is normally seated as in Figure 2 by the air pressure from the hose 46, but is adapted to be unseated by the nipple fitting when the nipple fitting is fully associated with the sleeve fitting B, as shown in Figure 3, whereupon the air flows around the hexagonal head of the plug 44 and through a slot 48 and then into the nipple fitting as indicated by the arrow 50 in Figure 3.

When the parts are in this position, the air pressure acting on the washer 38 tends to contract it, thus expanding its outer circumference against the sleeve 18 and contracting its inner circumference against the nipple fitting 14. This provides an effective seal between the nipple fitting and the sleeve fitting, yet permits rotation for swiveling purposes.

In placing the sleeve fitting B on the nipple fitting 14, either the hose 46 or the sleeve fitting can be taken hold of and the sleeve fitting merely pushed onto the nipple fitting, as shown in Figure 2. The faces 26 of the shoulders 24 will engage the pins 32 and push them outwardly in the slots 30, as shown, against the action of the spring 34. Finally when the shoulders pass the pins, the pins will be pushed down along the faces 28 of the shoulders to the position shown in Figure 3, whereupon the parts cannot be disconnected either accidentally or by pulling on the hose 46 away from the power unit 10. Any attempt to do so merely causes the faces 28 of the shoulders 24 to engage the pins and tend to hold them against the bottoms of the slots 30, and this holds the fittings against disassociation and yet permits them to swivel, since the pins 32 can move annularly in the grooves 29 formed where the faces 28 of the shoulders 24 terminate.

I provide a means for disconnecting the fittings relative to each other comprising a releasing sleeve 52 slidably mounted on the sleeve fitting B. It has an inwardly extending annular flange 54 adapted to engage the outer ends of the pins 32 and retract them outwardly in the slots 30 against the action of the spring 34 to the dotted position shown in Figure 3. Thereupon the sleeve fitting B can be pulled off the nipple fitting 14 and the cut-off valve 44 will close.

The sleeve 18 is provided with a ring groove 56 in which is mounted a spring ring 58 to act as a stop limiting outward movement of the releasing sleeve 52 relative to the sleeve fitting B. When the sleeve fitting is retracted, this ring can be taken out of the groove 56, so that the sleeve 52 can be taken off for repairs, replacement of parts, and the like, when desired.

Some types of grease guns, such as the one illustrated in Figure 1, require air pressure on the grease follower, which air pressure can be introduced through the fitting 16. This fitting is not provided with an annular shoulder 24 and is illustrated by dotted lines in Figure 3. Therefore, the sleeve fitting B can be pressed onto the nipple fitting 16 so as to charge the reservoir 12 with air by holding the sleeve fitting in position. As soon as the reservoir has been charged, then the sleeve fitting can be removed by merely pulling it off, since it has not been locked on the nipple fitting 16, as when applied to the nipple fitting 14.

By providing a speed coupler of the type illustrated, an air hose can be quickly disconnected from one grease gun and quickly connected with another one in a minimum of time, yet the advantage of a swivel connection, and one which can be made without turning off an air valve, is obtained.

When it is desired to charge or recharge the reservoir 12 with air, the hose can be quickly disconnected from the power unit 10 and held for a few seconds on the reservoir unit, and then locked back on the power unit. This eliminates the necessity of charging the reservoir 12 from an independent air chuck in the ordinary manner.

I have provided a speed coupler readily operable for connection and disconnection purposes, yet one which is effectively retained against disconnection when once the parts are associated with each other. Disconnection, however, is quickly accomplished by retracting the sleeve 52 with a single sliding motion which first retracts the pins 32 and then withdraws the sleeve fitting B from the nipple fitting 14.

From the foregoing description it is obvious that I have provided a coupler which, besides being adaptable for the particular use illustrated, is adaptable for coupling fluid pressure lines together, or fluid pressure lines and various apparatus together in a minimum of time without the necessity of manipulating any shut-off valves. The coupler can be used for liquids as well as compressed air or other gases.

Some changes may be made in the construction and arrangement of the parts of my device without departing from the real spirit and purpose of my invention, and it is my intention to cover by my claims any modified forms of structure, use of mechanical equivalents, or equivalent method, which may be reasonably included within their scope.

I claim as my invention:

1. In a quick fluid line coupler, a nipple fitting, a sleeve fitting adapted to receive said nipple fitting, slots in said sleeve fitting inclined inwardly and toward the outer end thereof, pins slidable in said slots, means constraining said pins toward the inner ends of said slots, said nipple fitting having shoulders for engaging said pins and sliding them outwardly in said slots against the action of said constraining means, said constraining means sliding said pins inwardly behind said shoulders after said shoulders have passed said pins.

2. In a quick fluid line coupler, a nipple fitting, a sleeve fitting adapted to receive said nipple fitting, slots in said sleeve fitting inclined inwardly and toward the outer end thereof, pins slidable in said slots, means constraining said pins toward the inner ends of said slots, said nipple fitting having shoulders for engaging said pins and sliding them outwardly in said slots against the action of said constraining means, said constraining means sliding said pins inwardly behind said shoulders after said shoulders have passed said pins and release means engageable with said pins for sliding them against the action of said constraining means to a position permitting said shoulders to pass said pins in a reverse direction.

3. In a fluid line coupler, a nipple fitting, a sleeve fitting adapted to receive said nipple fitting, slots in said sleeve fitting inclined inwardly and toward the outer end thereof, pins slidable in said slots, means constraining said pins toward the inner ends of said slots, said nipple fitting having shoulders for engaging said pins and sliding them outwardly in said slots against the action of said constraining means, said constraining means sliding said pins inwardly behind said shoulders after said shoulders have passed said pins and means in said sleeve fitting inward of said pins coacting with said nipple fitting to effect a seal between said sleeve fitting and said nipple fitting.

4. In a fluid line coupler, a nipple fitting, a sleeve fitting adapted to receive said nipple fitting, slots in said sleeve fitting inclined inwardly and toward the outer end thereof, pins slidable in said slots, means constraining said pins toward the inner ends of said slots, said nipple fitting having shoulders for engaging said pins and sliding them outwardly in said slots against the action of said constraining means, said constraining means sliding said pins inwardly behind said shoulders after said shoulders have passed said pins and means in said sleeve fitting inward of said pins coacting with said nipple fitting to effect a seal between said sleeve fitting and said nipple fitting, said last means comprising a resilient washer having a bore to snugly receive said nipple.

5. In a coupler of the class described, a nipple fitting, a sleeve fitting adapted to receive said nipple fitting, slots in said sleeve fitting inclined inwardly and toward the outer end thereof, pins slidable in said slots, means constraining said pins toward the inner ends of said slots, said nipple fitting having shoulders for engaging said pins and sliding them outwardly in said slots against the action of said constraining means, said constraining means sliding said pins inwardly behind said shoulders after said shoulders have passed said pins, means in said sleeve fitting inward of said pins coacting with said nipple fitting to effect a seal between said sleeve fitting and said nipple fitting and a sealing plug normally seated against said sealing means and sealed thereby, said plug being engageable by said nipple after it enters said sealing means and thereby unseated.

6. In a fluid line coupler, a nipple fitting, a sleeve fitting adapted to receive said nipple fitting, slots in said sleeve fitting inclined inwardly and toward the outer end thereof, pins slidable in said slots, means constraining said pins toward the inner ends of said slots, said nipple fitting having shoulders for engaging said pins and sliding them outwardly in said slots against the action of said constraining means, said constraining means sliding said pins inwardly behind said shoulders after said shoulders have passed said pins, means in said sleeve fitting inward of said pins coacting with said nipple fitting to effect a seal between said sleeve fitting and said nipple fitting, said last means comprising a resilient washer having a bore to snugly receive said nipple and a sealing plug normally seated against said sealing means and sealed thereby, said plug being engageable by said nipple after it enters said sealing means and thereby unseated.

7. In a fluid line coupler, a nipple fitting, a sleeve fitting adapted to receive said nipple fitting, slots in said sleeve fitting inclined inwardly and toward the outer end thereof, pins slidable in said slots, means constraining said pins toward the inner ends of said slots, said nipple fitting having shoulders for engaging said pins and sliding them outwardly in said slots against the action of said constraining means, said constraining means sliding said pins inwardly behind said shoulders after said shoulders have passed said pins, release means engageable with said pins for sliding them against the action of said constraining means to a position permitting said shoulders to pass said pins in a reverse direction and means in said sleeve fitting inward of said pins coacting with said nipple fitting to effect a seal between said sleeve fitting and said nipple fitting.

8. In a fluid line coupler, a nipple fitting, a sleeve fitting adapted to receive said nipple fitting, slots in said sleeve fitting inclined inwardly and toward the outer end thereof, pins slidable in said slots, means constraining said pins toward the inner ends of said slots, said nipple fitting having shoulders for engaging said pins and sliding them outwardly in said slots against the action of said constraining means, said constraining means sliding said pins inwardly behind said shoulders after said shoulders have passed said pin, release means engageable with said pins for sliding them against the action of said constraining means to a position permitting said shoulders to pass said pins in a reverse direction, means in said sleeve fitting inward of said pins coacting with said nipple fitting to effect a seal between said sleeve fitting and said nipple fitting, said last means comprising a resilient washer having a bore to snugly receive said nipple.

9. In a device as disclosed, a nipple fitting, a sleeve fitting adapted to receive said nipple fitting, slots in said sleeve fitting inclined inwardly and toward the outer end thereof, pins slidable in said slots, means constraining said pins toward the inner ends of said slots, said nipple fitting having shoulders for engaging said pins and sliding them outwardly in said slots against the action of said constraining means, said constraining means sliding said pins inwardly behind said shoulders after said shoulders have passed said pins, release means engageable with said pins for sliding them against the action of said constraining means to a position permitting said shoulders to pass said pins in a reverse direction, means in said sleeve fitting inward of said pins coacting with said nipple fitting to effect a seal between said sleeve fitting and said nipple fitting, and a sealing plug normally seated against said sealing means and sealed thereby, said plug being engageable by said nipple after it enters said sealing means and thereby unseated.

10. In a device as disclosed, a nipple fitting, a sleeve fitting adapted to receive said nipple fitting, slots in said sleeve fitting inclined inwardly and toward the outer end thereof, pins slidable in said slots, means constraining said pins toward the inner ends of said slots, said nipple fitting having shoulders for engaging said pins and sliding them outwardly in said slots against the action of said constraining means, said constraining means sliding said pins inwardly behind said shoulders after said shoulders have passed said pins and means in said sleeve fitting inward of said pins coacting with said nipple fitting to effect a seal between said sleeve fitting and said nipple fitting, said last means comprising a resilient washer having a bore to snugly receive said nipple, said resilient washer being floatingly mounted within said sleeve fitting.

11. In a fluid line coupler, a nipple fitting, a sleeve fitting adapted to receive said nipple fitting, slots in said sleeve fitting inclined inwardly and toward the outer end thereof, pins slidable in said slots, means constraining said pins toward the inner ends of said slots, said nipple fitting having shoulders for engaging said pins and sliding them outwardly in said slots against the action of said constraining means, said constraining means sliding said pins inwardly behind said shoulders after said shoulders have passed said pins, means in said sleeve fitting inward of said pins coacting with said nipple fitting to effect a seal between said sleeve fitting and said nipple fitting, said last means comprising a resilient washer having a bore to snugly receive said nipple, said resilient washer being floatingly mounted within said sleeve fitting and a sealing plug normally seated against said sealing means and sealed thereby, said plug being engageable by said nipple after it enters said sealing means and thereby unseated.

12. In a fluid line coupler, a nipple fitting, a sleeve fitting adapted to receive said nipple fitting, slots in said sleeve fitting inclined inwardly and toward the outer end thereof, pins slidable in said slots, means constraining said pins toward the inner ends of said slots, said nipple fitting having shoulders for engaging said pins and sliding them outwardly in said slots against the action of said constraining means, said constraining means sliding said pins inwardly behind said shoulders after said shoulders have passed said pins and a releasing sleeve slidable on said sleeve fitting and having an inwardly extending flange adapted to engage said pins and retract them against the action of said constraining means.

13. In a fluid line coupler, a nipple fitting, a sleeve fitting adapted to receive said nipple fitting, slots in said sleeve fitting inclined inwardly and toward the outer end thereof, pins slidable in said slots, means constraining said pins toward the inner ends of said slots, said nipple fitting having shoulders for engaging said pins and sliding them outwardly in said slots against the action of said constraining means, said constraining means sliding said pins inwardly behind said shoulders after said shoulders have passed said pins, a releasing sleeve slidable on said sleeve fitting and having an inwardly extending flange adapted to engage said pins and retract them against the action of said constraining means and means in said sleeve fitting inward of said nipple fitting to effect a seal between said sleeve fitting and said nipple fitting.

14. In a fluid line coupler, a nipple fitting, a sleeve fitting adapted to receive said nipple fitting, slots in said sleeve fitting inclined inwardly and toward the outer end thereof, pins slidable in said slots, means constraining said pins toward the inner ends of said slots, said nipple fitting having shoulders for engaging said pins and sliding them outwardly in said slots against the action of said constraining means, said constraining means sliding said pins inwardly behind said shoulders after said shoulders have passed said pins, a releasing sleeve slidable on said sleeve fitting and having an inwardly extending flange adapted to engage said pins and retract them against the action of said constraining means and means in said sleeve fitting inward of said nipple fitting to effect a seal between said sleeve fitting and said nipple fitting, said last means comprising a resilient washer having a bore to snugly receive said nipple.

15. In a fluid pressure coupling device, a nipple fitting, a sleeve fitting adapted to receive said nipple fitting, means for retaining said fittings relative to each other, slots in said sleeve fitting inclined inwardly and toward the outer end thereof, pins slidable in said slots, means constraining said pins toward the inner ends of said slots, said nipple fitting having shoulders for engaging said pins and sliding them outwardly in said slots against the action of said constraining means, said constraining means sliding said pins inwardly behind said shoulders after said shoulders have passed said pins and means for sealing one fitting relative to the other comprising a washer mounted within and substantially fitting the bore of said sleeve fitting and having a bore to receive and substantially fit the outside diameter of said nipple fitting, said washer being resilient whereby upon subjection to pressure within said sleeve fitting, its circumference is expanded against the bore of said sleeve fitting and the bore of the washer is contracted against the outside diameter of said nipple fitting to effect a seal which permits swiveling movement of said fittings relative to each other.

16. In a fluid line coupler, a nipple fitting having an annular shoulder, a sleeve fitting adapted to receive said nipple fitting and its shoulder, slots in said sleeve fitting inclined inwardly and toward the outer end thereof, pins slidable in said slots, means constraining said pins toward the inner ends of the slots, said pins being engageable by said shoulder for retraction against the action of said constraining means, said constraining means sliding said pins to position behind said shoulders after they have passed said pins, an annular washer within said sleeve fitting adapted to receive said nipple and a sealing plug normally seated against said annular washer and adapted to be unseated by said nipple fitting after it enters said washer.

IVAN L. EASTMAN.